(12) United States Patent
Yin

(10) Patent No.: US 7,869,471 B1
(45) Date of Patent: Jan. 11, 2011

(54) TUNABLE OPO LASER

(75) Inventor: Yusong Yin, Stonybrook, NY (US)

(73) Assignee: Photonics Industries International, Inc., Bohemia, NY (US)

( * ) Notice: Subject to any disclaimer, the term of this patent is extended or adjusted under 35 U.S.C. 154(b) by 197 days.

(21) Appl. No.: 11/827,703

(22) Filed: Jul. 12, 2007

(51) Int. Cl.
*H01S 3/10* (2006.01)

(52) U.S. Cl. .......................... 372/20; 372/21; 372/92; 372/99; 372/100

(58) Field of Classification Search .................. 372/20, 372/21, 92, 99, 100
See application file for complete search history.

(56) References Cited

U.S. PATENT DOCUMENTS

| | | | | |
|---|---|---|---|---|
| 5,936,983 A * | 8/1999 | Yusong et al. | ................ | 372/22 |
| 6,108,356 A | 8/2000 | Yin | | |
| 6,167,068 A * | 12/2000 | Caprara et al. | ................ | 372/22 |
| 6,229,829 B1 * | 5/2001 | Yin | .............. | 372/22 |
| 6,304,585 B1 | 10/2001 | Sanders et al. | | |
| 6,327,281 B1 * | 12/2001 | Yin | .............. | 372/22 |
| 6,710,914 B2 | 3/2004 | Arbore et al. | | |
| 6,975,402 B2 * | 12/2005 | Bisson et al. | ................ | 356/432 |
| 7,079,557 B1 | 7/2006 | Yin et al. | | |
| 2002/0048078 A1 * | 4/2002 | Schiller | ...................... | 359/330 |
| 2002/0080841 A1 * | 6/2002 | Yin et al. | ...................... | 372/75 |
| 2004/0179559 A1 * | 9/2004 | Butterworth et al. | .......... | 372/21 |
| 2005/0163187 A1 * | 7/2005 | Spinelli et al. | ................ | 372/94 |

* cited by examiner

*Primary Examiner*—Minsun Harvey
*Assistant Examiner*—Delma R Forde
(74) *Attorney, Agent, or Firm*—James A. Quinton

(57) ABSTRACT

A tunable OPO laser is provided. The laser includes an OPO cavity containing an OPO nonlinear crystal for generating a plurality of preselected wavelength beams of different wavelengths. The OPO cavity is formed between a first OPO reflective surface and a second OPO reflective surface. A laser cavity containing a lasing medium for generating a preselected wavelength fundamental beam is provided in optical communication with the OPO cavity. The laser cavity is partially separate and partially overlapping the OPO cavity. A beam separating prism is located in the overlapping portion of the two cavities. The beam separating prism separates electromagnetic radiation propagating through the prism into spatially separate paths of different wavelength. At least one of the OPO reflecting surfaces is moveable over a preselected range to reflect a selected wavelength of electromagnetic radiation propagating from the prism for amplification in the OPO cavity.

12 Claims, 2 Drawing Sheets ures have been disclosed having pump beams of variable wavelength which can change the wavelength generated by the OPO crystal. See U.S. Pat. Nos. 6,710,914 (Arbore) and 6,304,585 (Sanders). There is still a need for simple tunable OPO lasers.

TUNABLE OPO LASER

FIELD OF THE INVENTION

The field of the invention is OPO laser and in particular tunable OPO lasers.

BACKGROUND OF THE INVENTION

Lasers that utilize optical parametric oscillators (OPO) are well known in the art. Such lasers are desired because they can supply a large number of different wavelength beams. See U.S. Pat. No. 6,108,356 (Yin) and U.S. Pat. No. 7,079,557 (Yin). It desired that such lasers can be tuned to supply variable wavelengths from the same laser. Typically, such lasers were tuned by changing the phase matching angle of the crystal. Typically, OPO cavity mirrors were broad band to cover a range of wavelengths and the OPO crystal would be moved to change the phase matching angle. OPO lasers have been disclosed having pump beams of variable wavelength which can change the wavelength generated by the OPO crystal. See U.S. Pat. Nos. 6,710,914 (Arbore) and 6,304,585 (Sanders). There is still a need for simple tunable OPO lasers.

SUMMARY OF THE INVENTION

The present invention relates to a tunable OPO laser and a method of tuning an OPO laser. According to the invention, a tunable OPO laser is provided. The laser includes an OPO cavity containing an OPO nonlinear crystal for generating a plurality of preselected wavelength beams of different wavelengths. The OPO cavity is formed between a first OPO reflective surface and a second OPO reflective surface. A laser cavity containing a lasing medium for generating a preselected wavelength fundamental beam is provided in optical communication with the OPO cavity. The laser cavity is partially separate and partially overlapping the OPO cavity. A beam separating prism is located in the overlapping portion of the two cavities. The beam separating prism separates electromagnetic radiation propagating through the prism into spatially separate paths of different wavelength. At least one of the OPO reflecting surfaces is moveable over a preselected range to reflect a selected wavelength of electromagnetic radiation propagating from the prism for amplification in the OPO cavity.

In another aspect of the invention, a method for providing a tunable OPO laser beam is provided. A laser cavity is formed containing a lasing medium. The lasing medium generates a preselected wavelength fundamental beam. An OPO cavity is formed between a first OPO reflective surface and a second OPO reflective surface. At least one of the reflective surfaces is movable. An OPO nonlinear crystal is provided in the cavity between the reflective surfaces. The laser cavity is partially separate and partially overlapping the OPO cavity. The preselected wavelength fundamental beam is directed into the OPO cavity to convert a portion of the fundamental beam to parametric fluorescences having a plurality of different wavelengths. The parametric fluorescences and the fundamental beam propagate from the OPO nonlinear crystal and are directed to a wavelength separating prism located in the overlapping portion of the laser cavity with the OPO cavity so that the parametric fluorescences having a plurality of different wavelengths propagate on spatially separated propagation paths from the wavelength separating prism. A first fluorescence wavelength is selected from the spatially separated parametric fluorescences as the output wavelength of the laser. The movable OPO reflective surface is moved into optical communication with the selected fluorescence wavelength propagation path to reflect the selected spatially separated fluorescence back through the OPO crystal for amplification in the OPO cavity to form a beam having the selected wavelength.

In another aspect of the invention, a method of producing tunable OPO beams is provided. A second fluorescence wavelength is selected from the spatially separated parametric fluorescences. The movable OPO reflective surface is moved into optical communication with the second fluorescence wavelength propagation path to reflect the second selected spatially separated fluorescence back through the OPO crystal for amplification in the OPO cavity to form a second beam having the second fluorescence wavelength. The OPO beam is then directed outside the cavity as a laser beam output. Further wavelengths can be produced by selecting one or more additional wavelengths from the parametric fluorescences having a plurality of different wavelengths and moving the movable reflective surface to reflect the selected fluorescence back through the OPO crystal for amplification.

The preferred embodiment of the present invention is illustrated in the drawings and examples. However, it should be expressly understood that the present invention should not be limited solely to the illustrative embodiment.

DETAILED DESCRIPTION OF THE INVENTION

Figure 1:
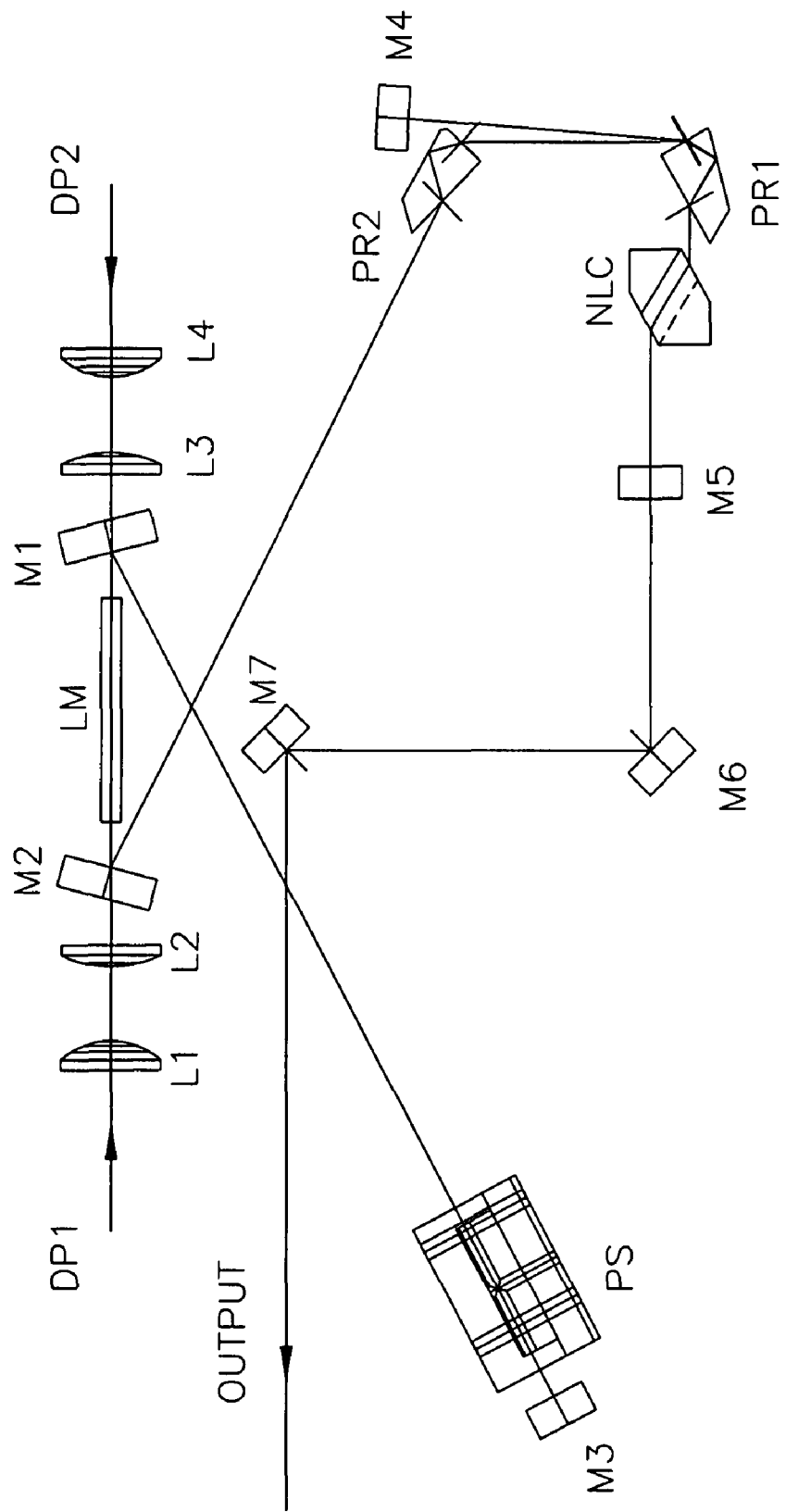
FIG. 1 is a schematic view of a laser according to the invention.

The present invention relates to a tunable OPO laser and a method of tuning an OPO laser. The resulting laser is desirably simple to manufacture and easy to tune. According to the invention, a tunable OPO laser is provided. The laser includes an OPO cavity containing an OPO nonlinear crystal for generating a range of preselected wavelength beams. Desirably the OPO crystal is an OPO nonlinear crystal for example a KTA, RTA, CTA, KTP, PPKTP, PPLN nonlinear crystal. The OPO nonlinear crystal is cut for critical phase matching for the range of preselected tunable wavelengths, or cut for Non-critical phase matching for a relatively small tuning range, but with narrower line width output. The OPO cavity is formed between a first OPO reflective surface and a second OPO reflective surface. Desirably the OPO reflective surfaces are a movable reflective mirror and an output coupler reflective for the preselected range of wavelengths. A laser cavity containing a lasing medium for generating a preselected wavelength fundamental beam is provided in optical communication with the OPO cavity. Desirably the lasing medium is a Nd:YAG, Nd:YLF, Nd:YVO$_4$ or Nd:GdVO$_4$ lasing medium. The laser cavity is preferably partially separate and partially overlapping the OPO cavity.

A beam separating prism is located in the overlapping portion of the two cavities. The beam separating prism separates electromagnetic radiation propagating through the prism into spatially separate paths of different wavelengths. One of the separated OPO wavelengths is then selected as the output of the laser. Desirably a beam diverter such as a reflecting mirror or a separating prism is provided along the separated fundamental beam path to direct the fundamental beam back through the lasing medium for amplification. Preferably the beam diverter is a separating prism to further separate the fundamental beam from OPO beams.

The laser is tunable over a range of either idler frequencies or signal frequencies. Generally when idler frequencies are chosen as the output of the laser, there is a large difference between the idler frequency and the fundamental beam frequency. For example for an Nd:YAG lasing medium, lasing at 1.06 µm and idler beam of 2.8 µm to 3.2 µm and a signal beam 1.59 µm to 1.604 µm can be produced. Thus for an idler frequency there is a good amount of spatial separation achieved from passing through the beam separating prism as the separation is related to the difference in frequencies. In such instance the beam diverter can be a mirror reflective for fundamental beam. When the signal frequencies are chosen as the output of the lasers, the signal beam is generally closer in wavelength to the fundamental beam than the idler. As a result the spatial separation between the fundamental beam and the signal beam propagating from the first separating prism is not as great. By including a separating prism along the fundamental beam path, the separation between signal and fundamental beam can be further increased so that only fundamental beam is directed to the lasing medium for amplification and the signal beam returned to the OPO cavity for amplification. Desirably the separating prism is a YAG or sapphire dispersion prism which produce larger dispersion between the fundamental beam and OPO output beam.

One of the OPO reflecting surfaces is moveable over a preselected range to reflect the selected wavelength of electromagnetic radiation propagating from the prism for amplification in the OPO cavity. Preferably one of the OPO reflective surfaces is highly reflective for beams over the preselected range and the second reflective surface is partially reflective and partially transmissive for OPO desirably about 5% to 30% transmissive to act as an output coupler for the laser.

In another aspect of the invention, a method for providing a tunable OPO laser beam is provided. A laser cavity is formed containing a lasing medium and generating a preselected wavelength fundamental beam. Desirably the lasing medium is a Nd:YAG, Nd:YLF, Nd:YVO$_4$ or Nd:GdVO$_4$ lasing medium.

An OPO cavity is formed between two reflective surfaces at least one of which is movable. Desirably, a first OPO reflective surface preferably an output coupler and a second OPO reflective surface preferably a movable mirror are provided. An OPO nonlinear crystal is provided in the cavity between the reflective surfaces. Desirably the OPO crystal is an OPO nonlinear crystal for example a KTA or KTP nonlinear crystal. The OPO nonlinear crystal is cut for critical phase matching for the range of preselected tunable wavelengths. The laser cavity is partially separate and partially overlapping the OPO cavity. The preselected wavelength fundamental beam is directed into the OPO cavity to convert a portion of the fundamental beam to parametric fluorescences having a plurality of different wavelengths. The parametric fluorescences having a plurality of different wavelengths and the fundamental beam propagate from the OPO nonlinear crystal. The parametric fluorescences and preferably the unconverted fundamental beam are directed to a wavelength separating prism located in the overlapping portion of the laser cavity with the OPO cavity so that the parametric fluorescences having a plurality of different wavelengths propagate on spatially separated propagation paths from the wavelength separating prism. The fundamental wavelength beam is separated as well. A first fluorescence wavelength is selected from the spatially separated parametric fluorescences as the output wavelength of the laser. The movable OPO reflective surface is moved into optical communication with the first fluorescence wavelength propagation path to reflect the selected spatially separated fluorescence back through the OPO crystal for amplification in the OPO cavity to form a beam having the first fluorescence wavelength. Desirably the moveable OPO reflective surface is a mirror. Preferably the moveable OPO reflective surfaces is highly reflective for wavelengths over the preselected tunable range. The other OPO reflective surface is partially reflective for the range of preselected tunable wavelengths and partially transmissive for the range of preselected tunable wavelengths desirably about 5% to 30% transmissive to act as an output coupler for the laser. The fundamental beam propagating from the beam separating prism is directed back through the lasing medium for further amplification. Desirably, the fundamental beam is directed through an additional beam separating prism for further spatial separation between the fundamental beam and OPO beams.

In another aspect of the method of producing tunable OPO beams of the invention, a second fluorescence wavelength is selected from the spatially separated parametric fluorescences. The movable OPO reflective surface is moved into optical communication with the second fluorescence wavelength propagation path to reflect the second selected spatially separated fluorescence back through the OPO crystal for amplification in the OPO cavity to form a second beam having the second fluorescence wavelength. The phase matching angle of OPO crystal is adjusted for conversion optimum efficiency to OPO output. The second wavelength beam is then directed outside the cavity as a laser beam output. Further wavelengths can be produced by selecting one or more additional wavelengths from the parametric fluorescences having a plurality of different wavelengths and moving the movable mirror to reflect the selected fluorescence back through the OPO crystal where the phase match angle is adjusted accordingly (for temperature tuning, the temperature will be adjusted accordingly) for amplification.

In FIG. 1, a tunable OPO laser according to the invention is provided. The laser includes an OPO cavity which is formed between two (2) reflective surfaces, M5 and M4. Mirror M4 is movably mounted to a mirror mount where angle PHI adjustment corresponding to the wavelength selection can be made. Within the OPO optical cavity an OPO nonlinear crystal NLC is provided.

A laser cavity containing a lasing medium LM for generating a preselected wavelength fundamental beam is provided in optical communication with the OPO cavity. Desirably the lasing medium is a Nd:YAG, Nd:YLF, Nd:YVO$_4$ or Nd:GdVO$_4$ lasing medium for example a Nd:YAG lasing medium LM lasing at 1.06 m. The laser cavity is partially separate and partially overlapping the OPO cavity. A tunable frequency in the idler range of 2.8 m to 3.2 m is chosen for the frequency output. Reflective surfaces M4 and M5 are reflective for the tunable frequency range.

A beam separating prism for example a YAG dispersion prism PR1 is provided in optical communication with the OPO nonlinear crystal NLC within the overlapping part of the OPO cavity and the laser cavity. The movable OPO end mirror M4 is provided in optical communication with OPO electromagnetic radiation propagating from dispersion prism PR1. A fundamental beam diverter is provided in optical communication with fundamental beam propagating from prism PR1. Desirably the beam diverter is a second beam separating prism PR2 in optical communication with fundamental beam propagating from dispersion prism PR1. Alternatively a mirror reflective for fundamental beam can used since there is sufficient separation between the idler and fundamental frequencies.

The OPO crystal is desirably a KTA or KTP crystal which is cut to provide a preselected range of OPO beam wavelengths. For example, an OPO crystal cut for 2.8 μm idler OPO output with an angle theta at 42° and an angle phi equal to 0° can desirably be used. The resulting OPO crystal will produce a range of OPO idler beams between 2.8 μm and 3.2 μm.

The laser cavity containing a laser medium desirably an Nd:YAG, Nd:YVO$_4$, Nd:YLF or an Nd:GO$_4$, laser crystal desirably a Nd:YAG lasing crystal LM for generating a fundamental beam at 1.06 um is provided in optical communication with the OPO cavity. The laser cavity is formed between laser cavity mirror M3 and mirror M5. M5 also acts as an output coupler for the device. M5 is partially transmissive and partially reflective for idler beam at 2.8 μm and 3.2 μm desirably about 5% to 30% transmissive and 95% to 70% reflective preferably about 10% transmissive and 90% reflective to act as an output coupler for the laser. M5 is reflective preferably highly reflective for fundamental beam desirably 99% or higher.

On either side of the laser medium are folding mirrors M1 and M2. M1 is highly reflective for fundamental beam from the laser crystal and highly transmissive for pump beam DP2 at approximately 808 nm. Mirror M2 is also highly reflective for fundamental beam and highly transmissive for pumping beam DP1 at 808 nm. A Q-switch PS is desirably provided between mirrors M3 and M1.

Pump beam focusing lenses L1 and L2 are provided in optical communication with mirror M2 to focus pump beam from diode pump DP1. Similarly, focusing lenses L3 and L4 for diode pump beam from diode pump DP2 are provided in optical communication with mirror M1. An optional dispersion prism PR2 is provided in optical communication with dispersion prism PR1. Dispersion prism PR2 is located in the laser cavity and could optionally be replaced by a reflective surface. For example, a mirror highly reflective for fundamental beam could be substituted. Mirrors M6 and M7 which are highly reflective for the tunable OPO frequency of 2.8 μm to 3.2 μm are provided in optical communication with mirror M5 to direct the output beam to a target.

Figure 2:
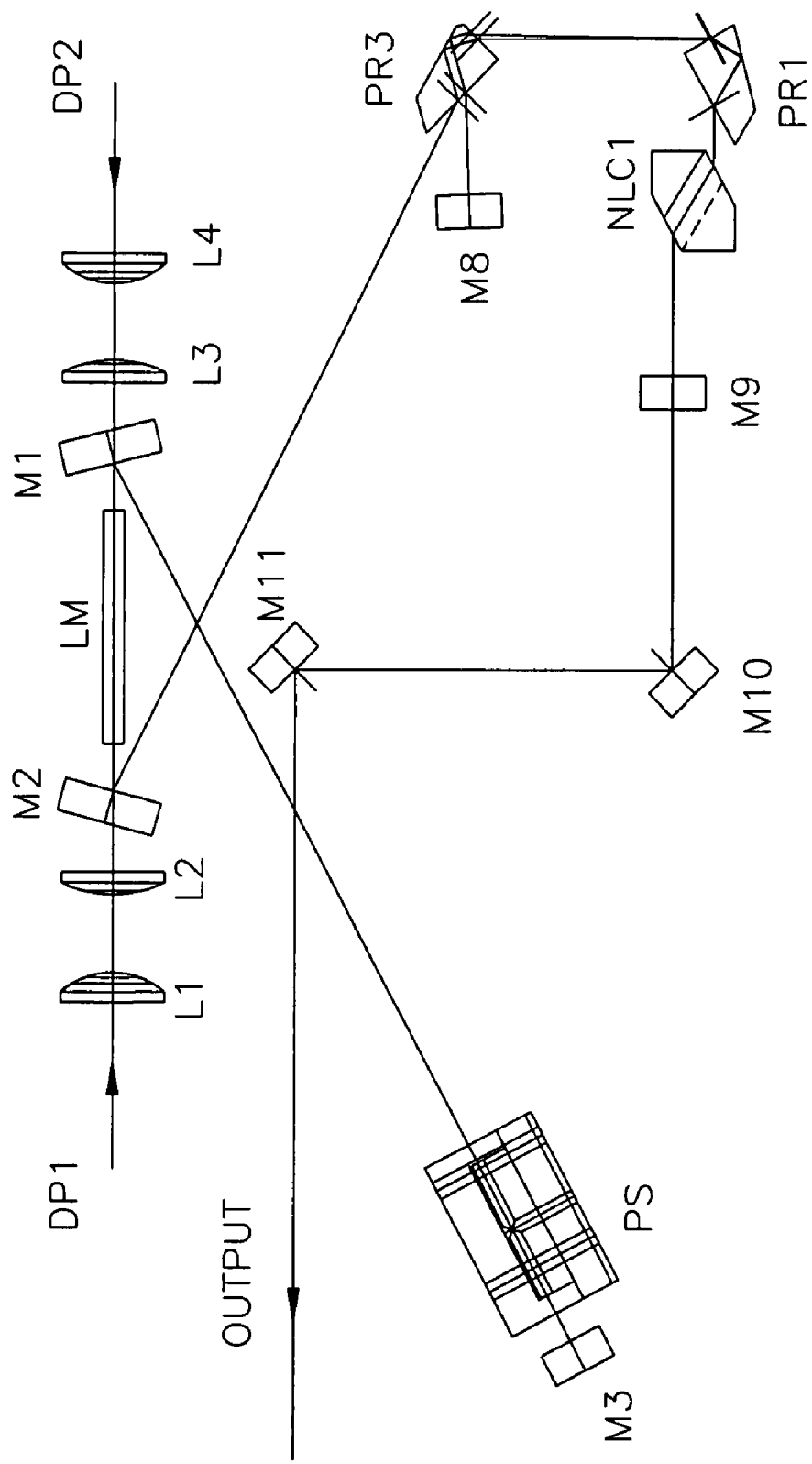
FIG. 2 is a schematic view of an alternative embodiment a laser according to the invention.

In operation, diode pump beams are introduced into the laser cavity to pump the laser crystal LM so that fundamental beam lases in the cavity at 1.06 μm for the Nd:YAG lasing medium. The beam is reflective by mirror M1 to mirror M3 through Q-switch PS. Mirror M3 reflects the beam back to mirror M1 which reflects the beam back through the crystal LM to mirror M2 which reflects the beam to prism PR2 or to an optional reflective surface where the fundamental beam is reflected to prism PR1 where it is directed to OPO crystal NLC where a portion of the fundamental beam is converted to OPO beam. The end mirror M5 transmits about 5% to 30% of the OPO idler frequency radiation and reflects the rest of the idler frequency radiation back within the OPO cavity. The fundamental beam is reflected back by mirror M5 for a further pass through the OPO crystal where further fundamental beam is converted to OPO beam. The fundamental and OPO beams are then directed to dispersion prism PR1 where beams of different wavelengths are spacially separated. The fundamental beam is spacially separated from the idler frequency radiation and directed outside the OPO cavity to prism PR2 which is outside the OPO cavity and in the laser cavity. The fundamental beam is then directed back to mirror M2 and back through laser crystal LM for further amplification. The beam separating prism PR1 is located in the overlapping portion of the laser and OPO cavities. Initially, the fundamental beam is converted by the OPO crystal to parametric fluorescences having a plurality of different wavelengths. These parametric fluorescences which propagate from the OPO nonlinear crystal are directed to the wavelength separating prism PR1 where the different wavelengths emerge from the dispersion prism propagating on spacially separated propagation paths. A first fluorescent wavelength is selected for amplification by tuning the laser to provide such a frequency beam. The movable OPO reflective surface is reflective preferably highly reflective for idler frequency 2.8 m and 3.2 m. Alternatively as shown in FIG. 2 a signal frequence laser can be provided. Mirror M4 is moved into optical communication with the selected fluorescent wavelength propagation path to reflect that selected spacially separated fluorescence back through the OPO crystal for amplification in the OPO cavity and ultimately forms the OPO beam having the first preselected wavelength.

Electromagnetic radiation reflected by mirror M4 is reflected back through prism PR1 through OPO crystal to mirror M5 which is partially reflective and partially transmissive for the range preselected OPO wavelengths (here 2.8 μm and 3.2 μm) where phase matching angle can be tuned from theta=43.1 degree to theta=41.8 degree. The OPO beam that is transmitted by mirror M5 is directed to mirror M6 where it reflected to mirror M7 which reflects the beam outside the laser. If a second wavelength OPO beam is desired, a second fluorescence wavelength is selected and the movable OPO reflective surface, namely mirror M4 is then moved to reflect the second selected spacially separated florescence back through the OPO crystal for amplification in the OPO cavity to form a second beam having the second fluorescence wavelength. This second beam is then directed outside the cavity as the laser output. This procedure can be repeated so that additional different fluorescences reflected by mirror M4 with a resulting different wavelength beam being supplied by the laser.

In FIG. 2, an alternative tunable OPO laser according to the invention is provided to supply a signal frequency OPO beam output. The laser includes an OPO cavity which is formed between two (2) reflective surfaces, M9 and M8. Mirror M8 is mounted into a mirror mount where mirror can be adjusted in theta and phi where theta is responsible for wavelength selection so the reflective surfaces can be moved from position to position. Within the OPO optical cavity an OPO nonlinear crystal NLC1 is provided.

A laser cavity containing a lasing medium LM for generating a preselected wavelength fundamental beam is provided in optical communication with the OPO cavity. Desirably the lasing medium is a Nd:YAG, Nd:YLF, Nd:YVO$_4$ or Nd:GdVO$_4$ lasing medium for example a Nd:YAG lasing medium LM lasing at 1.06 m. The laser cavity is partially separate and partially overlapping the OPO cavity. A tunable frequency in the signal range of 1.598 μm to 1.602 μm is chosen for the frequency output. Reflective surfaces M8 and M9 are reflective for the tunable frequency range.

A beam separating prism for example a YAG dispersion prism PR1 is provided in optical communication with the OPO nonlinear crystal NLC1 within the overlapping part of the OPO cavity and the laser cavity. A beam diverter is provided to direct fundamental beam back to the lasing medium LM for amplification. Since this is a signal frequence laser, there is not as much difference between the frequency of the fundamental and signal beams as in the idler embodiment. As a result, the spatial displacement from prism PR1 is not as great as in the idler embodiment of FIG. 1. It is desired to increase this displace to enhance the ease of separately manipulating the signal and fundamental frequency radiation. Thus preferably a second beam separating prism PR3 is provided in optical communication with fundamental beam and signal beam propagating from dispersion prism PR1. This increases the spatial displacement between the fundamental and signal beams so that OPO end mirror M8 can be placed in the signal beam path without the fundamental beam incidenting on the mirror. The movable OPO end mirror M8 is provided in optical communication with OPO signal electromagnetic radiation propagating from dispersion prism PR2.

The OPO crystal is desirably a KTA or KTP crystal which is cut to provide a preselected range of OPO beam wavelengths. For example, an OPO crystal cut for 1.6 um signal OPO output with an angle theta at 68° and an angle phi equal to 0° can desirably be used. For the tuning range of 1.598 um to 1.602 um, the angle tuning for KTA crystal will be from theta=67.8 degree, phi=0 to theta=67.4 degree, phi=0. The resulting OPO crystal will produce a range of OPO beams between 1.598 and 1.602.

The laser cavity containing a laser medium desirably an Nd:YAG, Nd:YVO$_4$, Nd:YLF or an Nd:GO$_4$, laser crystal desirably a Nd:YAG lasing crystal LM for generating a fundamental beam at 1.06 um is provided in optical communication with the OPO cavity. The laser cavity is formed between laser cavity mirror M3 and mirror M9. M9 also act as an output coupler for the device. M9 is partially transmissive and partially reflective for signal beam at 1.598 m to 1.602 m desirably about 5% to 30% transmissive and 95% to 70% reflective preferably about 10% transmissive and 90% reflective to act as an output coupler for the laser. M9 is reflective preferably highly reflective for fundamental beam desirably 99% or higher.

On either side of the laser material are folding mirrors M1 and M2. M1 is highly reflective for fundamental beam from the laser crystal and highly transmissive for pump beam DP2 at approximately 808 nm. Mirror M2 is also highly reflective for fundamental beam and highly transmissive for pumping beam DP1 at 808 nm. A Q-switch PS is desirably provided between mirrors M3 and M1.

Pump beam focusing lenses L1 and L2 are provided in optical communication with mirror M2 to focus pump beam from diode pump DP1. Similarly, focusing lenses L3 and L4 for diode pump beam from diode pump DP2 are provided in optical communication with mirror M1. An optional dispersion prism PR2 is provided in optical communication with dispersion prism PR1. Dispersion prism PR2 is located in the laser cavity and could optionally be replaced by a reflective surface. For example, a mirror highly reflective for fundamental beam. Mirrors M10 and M11 which are highly reflective for the tunable OPO frequency of 1.598 μm to 1.602 μm are provided in optical communication with mirror M9 to direct the output beam to a target.

In operation, diode pump beams are introduced into the laser cavity to pump the laser crystal LM so that fundamental beam lases in the cavity at 1.06 m a the Nd:YAG lasing medium. The beam is reflected by mirror M1 to mirror M3 through Q-switch PS. Mirror M3 reflects the beam back to mirror M1 which reflects the beam back through the crystal to mirror M2 which reflects the beam to prism PR3 which directs the fundamental beam to prism PR1 where it is directed to OPO crystal NLC1 where a portion of the fundamental beam is converted to OPO beam. The end mirror M9 transmits about 5% to 30% of the OPO signal frequency radiation and reflects the rest of the signal frequency radiation back within the OPO cavity. The fundamental beam is reflected back by mirror M9 for a further pass through the OPO crystal where further fundamental beam is converted to OPO beam. The fundamental and OPO beams are then directed to dispersion prism PR1 where beams of different wavelengths are spacially separated. The fundamental beam is spatially separated from the signal frequency radiation, but the separation is not as much as desired. Both the signal frequency and the fundamental frequency electromagnetic radiation are directed to prism PR3. The signal frequency and the fundamental frequency electromagnetic radiation are then further separated. The fundamental beam is then directed back to mirror M2 and back through laser crystal LM for further amplification. The signal frequency radiation is reflected by mirror M8 back to prism PR3 which direct the signal frequency electromagnetic radiation back to prism PR1 and then through OPO crystal NLC1 for further amplification.

The beam separating prism PR1 is located in the overlapping portion of the laser and OPO cavities. Initially, the fundamental beam is converted by the OPO crystal to parametric fluorescences having a plurality of different wavelengths. These parametric fluorescences which propagate from the OPO nonlinear crystal are directed to the wavelength separating prism PR1 where the different wavelengths emerge from the dispersion prism propagating on spacially separated propagation paths. A first fluorescence wavelength is selected for amplification by tuning the laser to provide such a frequency beam. The movable OPO reflective surface M8 is reflective preferably highly reflective for signal frequency 1.598 m and 1.602 um. Tuning is achieved by moving mirror M8 along the "PHI" direction into optical communication with the selected fluorescence wavelength propagation path to reflect that selected spatially separated fluorescence back through the OPO crystal for amplification in the OPO cavity and ultimately forms the OPO beam having the first preselected wavelength.

Electromagnetic radiation is reflected by mirror M8 is back through prism PR3 and PR1 through OPO crystal to mirror M9 which is partially reflective and partially transmissive for the range preselected OPO wavelengths (here 1.598 m and 1.602 m). The OPO beam that is transmitted by mirror M9 is directed to mirror M10 where it reflected to mirror M11 which reflects the beam outside the laser. If a second wavelength OPO beam is desired, a second fluorescent wavelength is selected and the movable OPO reflective surface, namely mirror M8 is then moved along the "PHI" direction to reflect the second selected spacially separated florescence back through the OPO crystal for amplification in the OPO cavity to form a second beam having the second fluorescence wavelength. The phase matching angle of NLC1 is adjusted for optimum efficiency. This second beam is then directed outside the cavity as the laser output. This procedure can be repeated so that additional different wavelength fluorescence are reflected by mirror M8 with a resulting different wavelength beam being supplied by the laser.

The foregoing is considered as illustrative only to the principals of the invention. Further, since numerous changes and modification will occur to those skilled in the art, it is not desired to limit the invention to the exact construction and operation shown and described above, and accordingly, all suitable modifications and equivalents may be resorted to, falling within the scope of the invention.

The invention claimed is:

1. A tunable OPO laser comprising:
 a) an OPO cavity containing an OPO nonlinear crystal for generating a plurality of OPO beams of preselected wavelengths;
 b) said OPO cavity formed between a first OPO reflective surface and a second movable OPO reflective surface;
 c) a laser cavity containing a lasing medium for generating a preselected wavelength fundamental beam;

d) said laser cavity partially separate and partially overlapping said OPO cavity;
e) a first beam separating prism located in said OPO cavity, said prism in optical communication with said first and second OPO reflective surfaces;
f) said first beam separating prism separating electromagnetic radiation propagating through the first beam separating prism into spatially separate paths of different wavelength prior to said radiation incidenting on said second movable OPO reflective surface;
g) said second movable OPO reflective surface moveable over a preselected range to selectively reflect electromagnetic radiation propagating on one of said spatially separated paths at a preselected wavelength back through said OPO nonlinear crystal for amplification;
h) said first beam separatism separating fundamental beam from said OPO beams on a spatially separate fundamental beam path;
i) a second beam separating prism located on said fundamental beam path to further spatially separate fundamental beam from other wavelength beams generated in said OPO cavity and direct said separated fundamental beam through said lasing medium for amplification;
j) said first beam separating prism located in said overlapping portion of said laser cavity and said OPO cavity.

2. The tunable laser according to claim 1 wherein said first beam separating prism is a YAG dispersion prism.

3. The tunable laser according to claim 1 wherein said first beam separating prism is a sapphire dispersion prism.

4. The tunable laser according to claim 1 wherein said the lasing medium is a Nd:YAG, Nd:YLF, Nd:YVO$_4$ or Nd:GdVO$_4$ lasing medium.

5. The tunable laser according to claim 4 wherein said OPO nonlinear crystal is cut for critical phase matching.

6. The tunable laser according to claim 4 wherein said OPO nonlinear crystal is cut for non-critical phase matching.

7. The tunable laser according to claim 4 wherein said OPO nonlinear crystal is a KTA, CTA, PPKTA, PPLN, RTA crystal.

8. The tunable laser according to claim 1 wherein said second movable OPO reflective surface is a mirror reflective for electromagnetic radiation of said preselected wavelengths.

9. The tunable laser according to claim 1 wherein said first OPO reflective surface is an output coupler partially transmissive and partially reflective for electromagnetic radiation of said preselected wavelengths.

10. The tunable laser according to claim 9 wherein said output coupler is about 5% to about 30% transmissive for electromagnetic radiation of said preselected wavelengths and 70% to 95% reflective.

11. The tunable laser according to claim 9 wherein said output coupler is reflective for fundamental beam.

12. The tunable laser according to claim 1 wherein said first beam separating prism separates fundamental beam from said OPO beams on a spatially separate fundamental beam path prior to said beams incidenting on said second movable OPO reflecting surface.

* * * * *